3,752,773
PREPARATION OF CATALYSTS
Roy B. Duke, Jr., and Larry M. Echelberger, Littleton, Colo., assignors to Marathon Oil Company, Findlay, Ohio
No Drawing. Filed Nov. 28, 1969, Ser. No. 880,958
Int. Cl. B01j 11/40; C10b 33/20
U.S. Cl. 252—454                    19 Claims

ABSTRACT OF THE DISCLOSURE

This disclosure describes a method for preparing catalysts resistant to attrition or other types of physical degradation. The catalysts are formed by blending catalyst precursors, such as metallic hydroxides, oxides, or salts, or mixtures thereof, with a clay-talc binder, adding sufficient moisture to render the mixture pliant, forming the pliant mixture into a shape useful in a catalytic reactor, and then heating the mixture to harden the binder and transform the metallic oxides, hydroxides, and salts to a useful catalytic form. A wide variety of catalysts may be prepared, useful in such reactions as hydrogenation, oxydehydrogenation, dehydrohalogenation, oxidation, dealkylation, disproportionation, automobile emission control, etc.

BACKGROUND OF THE INVENTION

(1) Field of the invention

This invention relates to the preparation of supported catalysts, and particularly catalysts containing a clay or clay-talc binder which are resistant to degradation or decomposition even under severe reaction conditions.

Many chemical processes currently in commercial use or under investigation employ catalysts which undergo a change in crystalline structure during the course of the reaction. For example, in the halogen-promoted, oxydehydrogenation of hydrocarbons, the halogen employed reacts with the metallic oxide catalyst converting it to the corresponding metallic halide thereby effecting a change in its crystalline structure. Similarly, metallic oxide catalysts used to dehydrohalogenate organic compounds, such as chlorinated, brominated, or iodinated hydrocarbons, are likewise converted to the corresponding metallic halide in the course of the reaction. In both of the examples cited above, the catalysts can be converted back to their oxide forms by passing oxygen or an oxygen-containing gas over the catalyst at elevated temperatures. In so doing, however, another change in the crystal structure of the catalyst is effected.

The overall effect of these reversible changes in the structure of the active components of the catalyst is to effect fractures in the tablet structure resulting in degradation. This, in turn, leads to fine particles which eventually plug the reactors. Furthermore, the life of the catalyst as well as its activity suffers.

The foregoing disadvantages, as well as others not specifically enumerated, are overcome by the catalyst prepared by the method of the present invention.

(2) Prior art

U.S. 2,323,874 to McMullen and Doan teaches the preparation of a hydrocarbon conversion catalyst consisting of supported zinc oxide. The catalyst has the following composition by weight:

| | Percent |
|---|---|
| Zinc oxide | 40 |
| Bentonite clay | 20 |
| Tripoli | 25 |
| Asbestos fiber | 15 |

McMullen and Doan teach the blending of the dry ingredients with water to form a paste which is formed into pellets, dried and subsequently heated to a temperature of about 1000° F. to break down the gel and transform the clay so that it no longer reacts with water. The primary distinction between the present invention and that described in U.S. 2,323,874 is that, in the latter, the catalyst ingredient, zinc oxide, is combined directly with the binder rather than in the form of a salt or hydroxide ("precursor") which is subsequently decomposed upon heating to form the catalystic oxide in the lattice of the clay binder. The "in situ" procedure of the present invention gives substantially more active catalysts as demonstrated in the examples appended to this disclosure. Further distinctions include differences in temperature of formation of the catalysts and their individual component make-up.

U.S. 2,973,372 to Mitchell and Moore teaches the use of clays to bond together molecular sieves which can be used as catalysts. Thus, similar to our earlier discussion of U.S. 2,323,874, the preformed catalytic ingredient, a zeolitic molecular sieve, is bound together with a clay. The molecular sieve is not formed "in situ" by heating a precursor to the molecular sieve along with the clay binder. Furthermore, Mitchell and Moore teach that the temperature must be controlled within certain upper limits to prevent the molecular sieves from losing their structural stability. Our studies have revealed no upper temperature which limits the application of our invention and our preferred temperatures are above those described as maximum in U.S. 2,973,372.

U.S. 3,384,602 to Robinson teaches the use of clays to form attrition-resistant molecular sieve catalysts. Their invention differs from the present invention in the same way U.S. 2,973,372 differs, i.e., the clay is mixed with preformed molecular sieves.

U.S. 3,146,210 to Baldwin, teaches the preparation of attrition-resistant alumina, beryllia, and zirconia catalyst pellets which can be used as catalyst supports by subsequent impregnation of the pellets with metallic salts. Our invention clearly differs from that of Baldwin in that the active oxide component of our catalysts is formed simultaneously with the formation of the attrition-resistant tablet. Furthermore, Baldwin made no reference to the use of clay binders.

SUMMARY OF THE INVENTION

Briefly described, we have found that degradation and attrition resistant caatlysts of low surface area can be prepared by (1) blending clay or a clay-talc binder with a catalyst precursor selected from metallic hydroxides, oxides, or salts or mixtures thereof, (2) adding sufficient moisture to make the blend pliant, (3) forming the pliant mixture into a shape useful for catalyst application, and (4) heating the blend at temperatures and for a time sufficient to harden the binder and transform the precursor to a useful catalytic form.

The use of the disclosed procedure for preparing catalysts leads to tableted structures of relatively low surface area which can undergo numerous changes in the crystalline structure of the active components of the catalyst without degradation of the catalyst tablets. Another useful application of the present invention is in the preparation of catalysts for use in reducing the harmful emissions from the exhausts of gasoline and diesel engines. These catalysts must be highly attrition-resistant to prevent mechanical degradation due to road shock. In addition, the catalysts must be able to withstand the thermal shock of rather sudden temperature changes encountered in engine warm-up and subsequent cool-down. The use of the present invention imparts the desired physical and chemical properties to catalysts of this type.

DESCRIPTION OF THE PREFERRED EMBODIMENTS

(1) Starting materials

The term "binder" in the present invention refers to the clay or clay-talc mixtures which are mixed with the catalyst precursor to form it into tablets. The amount of binder used may vary from catalyst to catalyst. Normally, the catalyst precursor is mixed with from 10 to 90 percent, but preferably from 20 to 80 percent and most preferably from 25 to 75 percent of the binder (by weight on a dry basis). The amount of talc blended with the clay to formulate the binder may range between zero and 80 percent (on a dry basis), but preferably between zero and 70 percent and most preferably between 10 and 60 percent. It is important that the binder not enter substantially into any deleterious side-reactions with the catalyst precursor or the activated form of the catalyst either during tablet formation or subsequent heating; otherwise, the activity of the catalyst may be impaired. It is also acceptable in the preferred practice of the present invention to use the necessary amounts of deflocculating agents such as sodium carbonate, sodium silicate, etc., to attain satisfactory performance of the binder and/or hinder precursor mixture.

The term "clay," when used in context with the present invention, must be interpreted in the broadest sense and this invention is not to be limited by subtle difference in the composition of substances which would or could be classified in the broadest sense as clays. Thus a clay may be defined as "an earthy or stony mineral aggregate consisting essentially of hydrous silicates and alumina, plastic when sufficiently pulverized and wetted, rigid when dry, and vitreous when fired at sufficient high temperatures." Alternatively a clay may be broadly defined as a "mixture of hydrous silicates of aluminum, iron, and magnesium with or without other rock and mineral particles, said clays being characterized by extreme fineness of particles (often colloidal in size) and by wide variations in physical and thermal (ceramic) properties and in mineral and chemical composition." Other definitions of the term "clay" may be found in the following volumes and the references contained therein and such clays are useful in the present invention:

Thorpe's Dictionary of Applied Chemistry, J. F. Thorpe and M. A. Whiteley, vol. III, 4th ed., Longmans, Green and Co., New York (1953)

Encyclopedia of Chemical Technology, Kirk-Othmer, vol. 6, 2nd ed., Interscience Publishers, New York (1965)

The preferred clays for use with our invention include: the kaolin group, including for example, kaolinite, dickite, nacrite, anauxite, halloysite, and endellite; the montmorillonite group, including for example, montmorillonite, beidellite, nontronite, hectorite, saponite, saucounite, and bentonite; the attapulgite and sepiolite group, including for example, attapulgite taken from the region of Attapulgus, Ga.; the high alumina clays, including for example, diaspore, boehmite, Gibbsite, and cliachite; and also the ball clays found principally in Kentucky and Tennessee and the fire clays produced in Missouri, Illinois, Ohio, Kentucky, Mississippi, Alabama, and Arkansas. Mixtures of the forementioned clays are likewise useful in the present invention as the clay portion of the binder.

Talc is a naturally occurring mineral with the formula, when theoretically pure, $H_2Mg_3(SiO_3)_4$ or $$3MgO \cdot 4SiO_2 \cdot H_2O.$$

Actually, the theoretical composition is rarely found in nature and even in apparently pure form, the water content may vary substantially. In addition, small amounts of other minerals, such as iron oxide and alumina, may also alter the stoichiometry of the substance. The use of talc in the present invention is not limited to pure talc but includes those naturally-occurring, impure talcs characterized by varying degrees of hydration and the presence of trace amounts of other mineral impurities. Thus, the term "talc," as used in the present invention constitutes that broad spectrum of minerals which may be classified as hydrous magnesium silicates. Talcs of random crystalline orientation are often referred to and sold as steatite. These, too, may be used in the practice of the present invention. Additional useful definitions of the term "talc" may be found in the following volumes and the references contained therein:

Encyclopedia of Chemical Technology, Kirk-Othmer, vol. 13, 1st ed. Interscience Publishers, New York 1954)

Thorpe's Dictionary of Applied Chemistry, Edited by J. F. Thorpe, vol. XI, 4th ed., Longmans, Green and Co., New York (1954)

The catalyst precursor(s) may be selected from a large group of compounds, specifically metallic salts, oxides, hydroxides, or mixtures thereof. The critical requirement is that the precursor converts to an active or more active form when heated according to the present invention. Providing the above requirement is met, metallic salts, oxides, or hydroxides or mixtures thereof of the following groups of the Periodic Table of the Elements may be used: I–V–A, I–VII–B, VIII and the lanthanides. When metallic salts are used as the catalyst precursors, the anion of the salt may be selected from a rather large group, for example, anions of metallic salts which transform to active oxides upon heating include the nitrates, oxalates, acetates, carbonates, halides, phosphates, and sulfates. Additional salts include those enumerated in Hackh's Chemical Dictionary, 4th edition, 1969 under the particular metal desired. Typical examples of metallic oxides which are converted to active oxides upon heating include the chromates, dichromates, vanadates, molybdates, ferrates, and the like. Typical examples of hydroxides and/or hydrated oxides which are converted to active oxides upon heating include iron hydroxide, potassium hydroxide, chromium hdyroxide, calcium hydroxide and the like.

Selection of any particular catalyst precursor depends upon the type of catalytic reaction to be conducted and the active catalyst species desired for that catalytic reaction. For example, if the catalytic reaction is oxydehydrogenation, copper chromite as taught in our application Ser. No. 851,737, filed Aug. 20, 1969, might be the desired active species. Preferred precursors of copper chromite include copper chromate ($CuCrO_4$), copper dichromate ($CuCr_2O_7$), copper chromate-copper oxides of varying compositions ($2CuCrO_4 \cdot 3Cu(OH)_2 \cdot H_2O$ or $CuCrO_4 \cdot Cu(OH)_2$), hydroxycopper (II) ammonium chromate ($Cu(OH)NH_4CrO_4$), copper oxide-chromium oxide ($2CuO \cdot Cr_2O_3$), copper hydroxide-chromium hydroxide ($Cu(OH)_2 \cdot Cr(OH)_3$), mixtures thereof and the like. Upon heating, these metallic salts, oxides, and hydroxides are converted to either copper (I) or copper (II) chromite depending upon the final calcining temperature. In addition, the final, active form of the catalysts may contain either copper oxide or chromium oxide along with the copper chromite depending upon the stoichiometry of the precursor. Copper (I) and copper (II) chromite catalysts prepared by the method of the present invention and from the foregoing precursors are also useful for the removal of hydrocarbons, carbon monoxide, and nitrogen oxides from the exhaust gases of gasoline and diesel engines. In addition, they are useful in catalyzing oxyhalogenations and oxidative coupling and dehydrogenation reactions.

(2) Activation of the catalyst

In many cases, simply heating the catalyst precursor in air converts it to its most active catalytic form; however, this is not always the case. For example, if manganese oxalate is decomposed in an oxygen-free atmosphere, manganese (II) oxide is the product; however, if the oxalate is decomposed in an oxidizing atmosphere, the manganese (III) oxide is the product. It is expedient, therefore, that the proper atmosphere be supplied during conversion of the catalyst precursor to the active catalyst. Manganese (II) oxide is a useful catalyst in removing traces of oxygen from inert gas streams. It is evident, therefore, that in order to prepare an active manganese (II) oxide catalyst, that decomposition of the oxalate must be carried out in either an inert or reducing atmosphere. Similarly, active hydrogenation catalysts are often prepared by thermally decomposing the catalyst precursor(s) in a hydrogen atmosphere.

(3) Forming the catalyst

Transformation of the binder-catalyst precursor mixture into a form useful in catalytic reactors may be effected by adding a solvent such as water, and/or other hydroxylic solvents, e.g. alcohols and glycols, to the mixture until it becomes pliant followed by extruding, casting, or otherwise shaping the pliant mixture into the desired form. After removing the solvent, (preferably at a temperature below 250° F.) the catalyst attains sufficient rigidity to be handled and may be transferred to a furnace, kiln, or reactor for the subsequent conversion of the catalyst precursor into its active form.

(4) Hardening the binder

In order to attain the maximum attrition resistance of the catalyst tablet, it must be put through a heating cycle to transform the binder from the crystalline form containing water of hydration to another crystalline form wherein it has lost all or substantially all of its water of hydration. In the latter crystalline form it is no longer able to react reversibly with water to yield the first crystalline form or another crystalline form which yields a pliant mass when contacted with water.

The optimum heating cycle for inducing maximum attrition resistance in the catalyst tablet is dependent upon both the catalyst precursor and the binder employed and is best determined experimentally. For this reason, it is impossible to outline detailed conditions which would result in maximum strength for all catalyst preparations for which the disclosure process is applicable; however, it is possible to outline certain general transformations that clays undergo upon heating. When these transformations are adequately controlled, stain-free, attrition-resistant catalysts can be produced.

During the firing of a clay, three important periods occur. These are, for example: (1) the water-smoking period ranging from room temperature to about 500° F., (2) the oxidation period, ranging from 750° to 1550° F., and (3) the vitrification period, ranging from 1450° to 2700° F.

During the first or smoking period, the clay loses substantially all of its moisture and setting of the clay is observed. The amount of time and the optimum temperature for effecting this transformation is dependent upon the particular clay being employed. In the preparation of attrition-resistant catalysts, it is necessary that sufficient time be spent effecting this transformation to insure that the water has time to migrate to the surface of the tablet and to thus escape; otherwise, strains may result in the catalyst tablet which result in subsequent fracture and degradation.

The second period, i.e., the oxidation period, is a period of phase transformation in the clay. It is also a period in which the trace impurities in the clay, such as iron salts, undergo transformation to the oxides. As with the smoking period, the heating cycle should be carefully controlled so that the transformations occurring during this period do not lead to strains in the catalyst tablet.

The third period, i.e., vitrification period, occurs at high temperatures and should be avoided. Vitrification is the transformation of the clay to a glassy, porcelain-like substance. If the catalyst precursor-binder mixture is heated to temperatures high enough to effect vitrification, the resulting catalyst loses essentially all of its surface area and the active sites are effectively sealed, rendering the catalyst largely inactive. Because some clays undergo vitrification at temperatures as low as 1450° C., these should be avoided if higher temperatures are required to effect the desired changes in the catalyst precursor. In general then, hardening of the binder is preferably accomplished with temperatures ranging above the smoke point, but below the vitrification temperature of the binder. For the common clays preferred in the practice of our invention, such as the ball clays, kaolin, bentonite, etc., the preferred calcining temperatures are in the range of 1000–2500° F., but most preferably in the range of 1100–2500° F., but most preferably in the range of 1100–2200° F.

(5) Examples

The following examples are illustrative of preferred embodiments of the invention but are not meant to limit it in any way. The examples teach the preparation of the catalysts and their use in several catalytic processes. They also compare the activity of the disclosed catalysts with conventional catalysts. Percentages are by weight unless otherwise noted.

EXAMPLE I

Preparation and evaluation of a clay-supported, cerium-promoted, copper chromite catalyst for halogen-promoted oxydehydrogenation of hydrocarbons Copper nitrate ($Cu(NO_3)_2 \cdot 3H_2O$), 217.4 g. (0.9 F.W.) and cerium nitrate ($Ce(NO_3)_3 \cdot 6H_2O$), 29.1 g. (0.067 F.W.) are dissolved in 500 ml. of water and then mixed with potassium chromate ($K_2CrO_4$), 194.2 g. (1.0 F.W.) also dissolved in 500 ml. of water. To the resulting precipitate is added 350 g. of a binder consisting of 16⅔% Tennessee ball clay, 16⅔% Kentucky ball clay, 16⅔% plastic vitrox, and 50% talc. The mixture is stirred well to assure uniform dispersion of the copper and cerium chromates and the binder and then filtered. After most of the water is removed, the binder-catalyst precursor, which is paste-like in substance, is pressed into a tablet mold and allowed to air dry. After air drying, the hardened catalyst precursor-binder tablet is removed from the mold, placed in a furnace, and taken through a heating cycle to a maximum temperature of 1600° F. During the heating cycle, the red-brown catalyst precursor-binder tablets are transformed into black, copper chromite tablets.

The upper-half of a Hastelloy C[1] tubular reactor, 26 inches long and one inch in diameter, is filled with ⅛ inch Mullite spheres and the lower-half with the supported, cerium-promoted, copper chromite catalyst. The reactor is placed in a furnace where the temperature of the inert and the catalyst sections are controlled at 1000° F. Ethylbenzene, containing 2% iodine, and air are fed to a mixing T and then allowed to pass downflow through the reactor, first over the Mullite spheres and then over the cerium-promoted copper chromite catalyst at an oxygen-to-ethylbenzene ratio of 0.80 and the gaseous hourly space velocity of 145 hrs.$^{-1}$. The conversion, yield and selectivity obtained from this reaction are 90.5%, 80.7%, and 0.892, respectively.

EXAMPLE II

Preparation and evaluation of a clay-supported, copper chromite catalyst for the halogen-promoted oxydehydrogenation of hydrocarbons The method of catalyst preparation as described in Example I is employed, except that the cerium nitrate

---

[1] Trademark of Hanes Stellite Co., Div. of Union Carbide Corp., 270 Park Ave., N.Y., 10017.

is omitted and the copper nitrate increased to 241.6 g. The resulting catalyst is placed in the lower-half of the reactor described in Example I and the oxydehydrogenation of ethylbenzene studied under identical conditions. The conversion, yield, and selectivity to styrene are 84.3%, 75.4%, and 0.894, respectively.

EXAMPLE III

Preparation and evaluation of a conventional, clay-supported copper chromite catalyst for the halogen-promoted oxydehydrogenation of hydrocarbons Harshaw's Cu–1106P, copper chromite catalyst, 150 g., is mixed with 350 g. of the binder mixture described in Example I, formed into tablets with the aid of water, and subsequently heated to 1600° F. The catalyst tablets are then placed in the lower-half of the reactor described in Example I and the oxydehydrogenation of ethylbenzene to styrene studied under identical conditions. The conversion, yield, and selectivity are 70.4%, 63.6%, and 0.903, respectively.

EXAMPLES IV–VIII

Comparison of activity and attrition-resistance of commercial, and clay-supported, copper chromite catalysts for the halogen-promoted, oxydehydrogenation of hydrocarbons The lower-half of the reactor described in Example I is filled in turn with each of the catalysts denoted in Table 1. The iodine-promoted, oxydehydrogenation of ethylbenzene to styrene is then studied over each catalyst and the yield to styrene determined. After each experiment, air and water are passed over the catalyst at 1000° F. to remove the iodine and polymer. The experiments are repeated until either 20 consecutive runs have accumulated on the catalyst or the reactor plugs due to catalyst degradation. The reactor is then opened and the catalyst examined. The observations are tabulated in Table 1.

TABLE 1

| Ex. | Catalyst | Yield, percent | Regeneration, cycles | Condition of catalyst |
|---|---|---|---|---|
| IV | Girdler's G-22 | 70.1 | 2 | Complete degradation |
| V | Harshaw's Cu-1106 | 73.2 | 2 | Do. |
| VI | Girdler's T-531 | 72.7 | 7 | Partial degradation, most of the catalyst tablets fractured, substantial amounts of powder. |
| VII | Clay-supported catalyst (Ex. I). | 80.7 | 20 | Excellent—negligible degradation. |
| VIII | Clay-supported catalyst (Ex. II). | 75.4 | 20 | Do. |

EXAMPLE IX

Preparation and evaluation of a clay-supported, potassium oxide catalyst for the removal of halogens from organic compounds Potassium hydroxide, 100 g. and 400 g. of the binder described in Example I are formed into a pliant mixture with the aid of water, then cast into tablets and dried at 175–212° F. The resulting tablets are placed in a furnace and taken through a heating cycle to a maximum temperature of 1800° F.

A stainless steel reactor, similar to that described in Example I is filled with the catalyst.

A sample of crude styrene, prepared by the iodine-promoted, oxydehydrogenation of ethylbenzene containing 91.2% styrene, 8.0% ethylbenzene, 0.18% iodine, and the remainder benzene and toluene, is passed over the catalyst at gaseous hourly spaced velocities ranging from 56–62 hrs.[-1]. The effect of temperature of the iodine concentration of the reactor effluent is shown in Table 2.

TABLE 2

Effect of temperature on the iodine content of crude styrene

| Temperature, ° F.: | Iodine, percent |
|---|---|
| 400 | 0.13–0.15 |
| 600 | 0.13–0.15 |
| 800 | 0.06–0.08 |
| 1000 | [1] <0.002 |

[1] Lowest detectable limit.

The iodine in crude styrene is organically bound as evidenced by the fact that repeated washings with an aqueous sodium thiosulfate solution failed to lower the 0.18% value. The iodine values were determined by an X-ray fluorescence technique. The lower limit of detection is ~0.002 percent (20 p.p.m.). The deiodenated crude styrene sample taken at 1000° F. actually shows no fluorescence signal due to iodine. The composition of the crude styrene changes only negligibly during deiodination.

After a substantial quantity of the crude styrene has been deiodinated, air is passed over the catalyst and the theoretical amount of iodine recovered essentially quantitatively. Examination of the catalyst after 20 deiodinations of the crude styrene shows no discernible degradation of the catalyst.

EXAMPLE X

Preparation and evaluation of a clay-supported copper chloride catalyst for the oxychlorination of ethylene Copper chloride ($CuCl_2 \cdot 2H_2O$), 170.5 g. (1.0 F.W.) is dissolved in water and mixed with 400 g. of Kentucky Ball Clay to form a pliant substance which is then pressed into a tablet mold. After air drying the catalyst precursor-binder mixture is placed in a furnace and taken through a heating cycle to a maximum temperature of 1800° F. to harden the binder and activate the catalysts.

The lower-half of the reactor deescribed in Example I is filled with the catalyst and mixtures of hydrogen chloride, air, and ethylene passed through the reactor at temperatures ranging from 750 to 1100° F. The catalysts gave good conversions, yields, and selectivities of ethylene and hydrogen chloride to a mixture of chlorinated products including $C_2HCl_3$, $C_2Cl_4$, $C_2HCl_5$, $C_2Cl_6$, 1,2-$C_2H_2Cl_2$, 1,1-$C_2H_2Cl_2$, and $C_2HCl$.

The catalyst is examined after 20 experiments in which the temperature and hydrogen chloride-air-ethylene ratios are varied substantially. The amount of catalyst degradation is negligible.

EXAMPLE XI

Preparation and evaluation of a clay-supported, copper chromite catalyst for the removal of hydrocarbons and carbon monoxide from automobile exhausts The catalyst prepared in Example II is evaluated as to its effectiveness in removing hydrocarbons and carbon monoxide from exhaust gases similar to those emitted by gasoline internal combustion engines. The catalyst, at temperatures from 600° to 1200° F., is capable of reducing an exhaust gas containing 500 p.p.m. hydrocarbon and 2% carbon monoxide to less than 50 p.p.m. hydrocarbons and less than 0.3% carbon monoxide. An equal volume of air is fed along with the exhaust gas to the reactor containing the catalyst.

EXAMPLE XII

The procedure of Example XI is repeated using the catalyst prepared in Example III. The catalyst is effective in reducing the hydrocarbon and carbon monoxide concentration level of the exhaust gas.

EXAMPLE XIII

Preparation and evaluation of a clay-supported vanadia catalyst for the oxidation of orthoxylene and naphthalene Vanadium pentoxide, 181.8 g., in 1,000 ml. of water is heated to about 200° F. followed by the addition of 270 g. of oxalic acid is small increment. The resulting blue solution of vanadium oxalate is mixed with 500 g. of the clay-talc mixture described in Example I. The water is allowed to evaporate from the mixture until a paste-like mixture is obtained after which the binder-catalyst precursor mixture is extruded into one-eighth inch extrudates. The extrudates are then placed in the reactor described in Example I and air passed over the catalyst at 750° F. for four hours. Naphthalene and o-xylene are then air oxidized by passing them over the catalyst. Good yields to phthalic anhydride are obtained and without degradation of the catalyst after continued use.

EXAMPLE XIV

Preparation and evaluation of a clay-supported nickel for the hydrogenation of acetone Nickel nitrate hexahydrate, 290.1 g., dissolved in about 300 ml. of water is added to oxalic acid, 90 g., dissolved in about 1,000 ml. of water at about 200° F. The resulting precipitate of nickel oxalate is washed several times by decantation and then filtered. The nickel oxalate is mixed with 400 g. of bentonite clay and sufficient water are added to make the mixture pliant after which the mixture is cast into a catalyst tablet mold. The resulting tablets are then placed in a reactor similar to that described in Example I. Hydrogen is passed through the catalyst bed and the temperature slowly raised to 600° F. Acetone is then hydrogenated to isopropanol by passing the ketone through the reactor at 400° F. and 1,000 p.s.i.g. of hydrogen pressure. No catalyst degradation is observed (6) Modifications It should be understood that the invention is capable of a variety of modifications and variations which will become apparent to those skilled in the art by a reading of the specification and which are to be included within the spirit of the claims appended hereto. For instance, those skilled will realize that a variety of materials, in addition to the essential blend of clay or clay-talc and catalyst precursor, may be incorporated into the catalyst to give it desired qualities for a particular use.

What is claimed is:

1. A method of preparing degradation and attrition-resistant catalysts consisting essentially of in sequence, the steps of:
   (1) blending 20 to 80% by weight on a dry basis of an uncalcined binder comprising clay or a mixture of clay and talc with a solid catalyst precursor, which is a compound containing copper and chromium or a mixture of compounds containing copper and chromium, which precursor when heated, gives copper chromite,
   (2) adding sufficient moisture to render the catalyst precursor-binder mixture pliant,
   (3) forming the pliant mixture into shape useful for catalyst application, and
   (4) heating the mixture at temperatures below vitrification and for a time sufficient to harden the binder and transform the catalyst precursor into a useful catalytic species.

2. The method of catalyst preparation according to claim 1 wherein the binder contains between one and 80% talc.

3. The method of catalyst preparation according to claim 1 wherein the clay is of the kaolin group.

4. The method of catalyst preparation according to claim 1 wherein the clay is of the montmorillonite group.

5. The method of catalyst preparation according to claim 1 wherein the clay is of the attapulgite group.

6. The method of catalyst preparation according to claim 1 wherein the clay is of the high alumina group.

7. The method of catalyst preparation according to claim 1 wherein the clay is of the ball group.

8. The method of catalyst preparation according to claim 1 wherein the clay is of the fire clay group.

9. The method of catalyst preparation according to claim 1 wherein the catalyst precursor-binder mixture is put through a heating cycle such that the maximum temperature is above the smoke-point but below vitrification temperature of the clay.

10. The method of catalyst preparation according to claim 1 wherein the maximum temperature in the heating cycle is between 1000° and 2500° F.

11. The method of catalyst preparation according to claim 1 wherein the catalyst precursor also contains metallic salts, oxides, or hydroxides of Groups Ia, IIa, VIII, or the Lanthanide series of the Periodic Table of the Elements.

12. The method of catalyst preparation according to claim 11 wherein the maximum temperature in the heating cycle is controlled to give either Copper(I) or Copper(II) chromite.

13. The method of catalyst preparation according to claim 1 wherein the catalyst precursor comprises a salt, oxide, or hydroxide of Group Ia and IIa of the Periodic Table of the Elements.

14. The method of catalyst preparation according to claim 13 wherein the catalyst is effective in the dehalogenation or dehydrohalogenation of haolgen-containing organic compounds.

15. The process of claim 1 wherein the catalyst precursor is copper chromate.

16. The process of claim 1 wherein the catalyst precursor is a cerium promoted copper chromate.

17. A method of preparing degradation and attrition-resistant clay-supported copper chromite catalysts consisting essentially of in sequence the steps of;
   (1) blending a solid precursor of copper chromate with a 20 to 80% by weight on a dry basis of an uncalcined binder comprising clay or a mixture of clay and talc wherein said clay is selected from the group consisting of kaolinite, dickite, nacrite, anauxite, halloysite, endellite, montmorillonite, beidellite, nontronite, hectorite, saponite, sauconite, bentonite, attapulgite, sepiolite, diaspore, boehmite, Gibbsite, cliachite, Kentucky ball clay, Tennessee ball clay, and fire clay or mixtures thereof,
   (2) adding sufficient moisture to render the catalyst precursor-binder mixture pliant,
   (3) forming the pliant mixture into a shape useful for catalyst application, and
   (4) heating the mixture above the smoke point but below the vitrification temperature of the clay binder for a time sufficient to harden the binder and transform the precursor to copper chromite.

18. The method of claim 17 wherein the precursor is selected from the group consisting of copper chromate, copper ammonium chromate, copper dichromate, copper chromate-copper oxides, basic copper chromate, hydroxycopper(II) ammonium chromate, copper oxide-chromium oxide, copper hydroxide-chromium hydroxide, or mixtures thereof.

19. A catalyst for removal of hydrocarbons and carbon monoxide emanating from gasoline internal combustion engines by contacting said hydrocarbons and carbon monoxide within a container packed with said catalyst, prepared by the sequential steps comprising;
   (1) blending solid copper chromite precursor with a 20 to 80% by weight on a dry basis of an uncalcined binder comprising clay or a mixture of clay and talc wherein said clay is selected from the group consisting of kaolinite, dickite, nacrite, anauxite, halloysite, endellite, montmorillonite, beidellite, non-nontronite, hectorite, saponite, saucounite, bentonite, attapulgite, sepiolite, diaspore, boehmite, Gibbsite, cliachite, Kentucky ball clay, Tennessee ball clay, and fire clay, or mixtures thereof;

(2) adding sufficient moisture to render the blend pliant,
(3) forming the pliant blend into a shape useful for catalyst application; and
(4) heating the blend above the smoke point but below the vitrification temperature of the clay binder for a time sufficient to harden the binder.

References Cited

UNITED STATES PATENTS

| | | | |
|---|---|---|---|
| 2,265,682 | 12/1941 | Bennett | 252—458 |
| 3,001,953 | 9/1961 | Reitmeier et al. | 252—455 |
| 3,443,886 | 5/1969 | Taylor et al. | 252—454 X |
| 3,447,983 | 6/1969 | Stephens et al. | 252—454 X |
| 2,670,321 | 2/1954 | Morrell | 252—458 X |
| 3,235,512 | 2/1966 | Koepernik | 252—455 R |
| 3,428,573 | 2/1969 | Reitmeier et al. | 252—455 R |

CARL F. DEES, Primary Examiner

U.S. Cl. X.R.

252—455 R, 457, 458, 459

UNITED STATES PATENT OFFICE
CERTIFICATE OF CORRECTION

Patent No. 3,752,773　　　　　　　Dated  August 14, 1973

Inventor(s)  Roy B. Duke, Jr. and Larry M. Echelberger

It is certified that error appears in the above-identified patent and that said Letters Patent are hereby corrected as shown below:

| | |
|---|---|
| Column 1, line 16 | Before "clay-talc binder," insert --clay or-- |
| Column 2, line 49 | Correct the spelling of "catalysts" |
| Column 6, line 16 | Delete "the range of 1100-2500°F., but most preferably in" |
| Column 9, Line 1 | Delete "is small increment." and insert--in small increments.-- |
| Column 10, line 71 | Delete "non-" |

Signed and Sealed this ninth Day of August 1977

[SEAL]

Attest:

RUTH C. MASON
*Attesting Officer*

C. MARSHALL DANN
*Commissioner of Patents and Trademarks*